US008611537B2

(12) United States Patent
Bhatt (10) Patent No.: US 8,611,537 B2
(45) Date of Patent: Dec. 17, 2013

(54) METHOD AND SYSTEM FOR OPTIMIZING AUTHENTICATION PROCEDURES IN MEDIA INDEPENDENT HANDOVER SERVICES

(75) Inventor: Anirudh Bhatt, Jagadishnagar (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/320,235

(22) PCT Filed: May 11, 2010

(86) PCT No.: PCT/KR2010/002994
§ 371 (c)(1),
(2), (4) Date: Nov. 11, 2011

(87) PCT Pub. No.: WO2010/131896
PCT Pub. Date: Nov. 18, 2010

(65) Prior Publication Data
US 2012/0057706 A1      Mar. 8, 2012

(30) Foreign Application Priority Data
May 11, 2009   (IN) .......................... 1081/CHE/2009

(51) Int. Cl.
*H04K 1/00* (2006.01)
(52) U.S. Cl.
USPC .......................................... 380/270; 713/194
(58) Field of Classification Search
USPC ....................................................... 380/270
See application file for complete search history.

(56) References Cited

U.S. PATENT DOCUMENTS

| 2008/0175393 | A1* | 7/2008 | Oba et al. | 380/279 |
| 2008/0310366 | A1* | 12/2008 | Oba et al. | 370/331 |
| 2009/0067385 | A1* | 3/2009 | Murahari et al. | 370/331 |
| 2010/0131663 | A1* | 5/2010 | Lee et al. | 709/228 |

FOREIGN PATENT DOCUMENTS

WO   WO 2009/008627 A2   1/2009

OTHER PUBLICATIONS

Jinsu Kim; Secure and Efficient Recommendation Service of RFID System using Authenticated Key Management; Year: 2009; IEEE; pp. 1-7.*
International Search Report dated Dec. 15, 2010 in connection with International Application No. PCT/KR2010/002994.
Written Opinion of the International Searching Authority dated Dec. 15, 2010 in connection with International Application No. PCT/KR2010/002994.

* cited by examiner

*Primary Examiner* — Mohammad W Reza
*Assistant Examiner* — Monjour Rahim (57) ABSTRACT

A method and system for establishing security association mechanism between a Mobile Node (MN) and a plurality of Point of Services (PoS) are provided. The method includes sending a first request from primary PoS to secondary PoS. The primary PoS then receives a first response along with a derived first key. The first key is derived at the secondary PoS. The method further includes receiving a second request from the MN at the primary PoS. The method then derives a second key based on a MN identity and the derived first key. Thereafter, the method sends a second response along with a second key from the primary PoS to the MN. Further, the method establishes communication between the MN and secondary PoS based on the second key received by the MN and the second key generated at the secondary PoS.

20 Claims, 5 Drawing Sheets

METHOD AND SYSTEM FOR OPTIMIZING AUTHENTICATION PROCEDURES IN MEDIA INDEPENDENT HANDOVER SERVICES

CROSS-REFERENCE TO RELATED APPLICATION(S)

The present application claims priority under 35 U.S.C. §365 to International Patent Application No. PCT/KR2010/002994 filed May 11, 2010, entitled "METHOD AND SYSTEM FOR OPTIMIZING AUTHENTICATION PROCEDURES IN MEDIA INDEPENDENT HANDOVER SERVICES". International Patent Application No. PCT/KR2010/002994 claims priority under 35 U.S.C. §365 and/or 35 U.S.C. §119(a) to Indian Patent Application Nos. 1081/CHE/2009 filed May 11, 2009 and 1081/CHE/2009 filed May 10, 2010 and which are incorporated herein by reference into the present disclosure as if fully set forth herein.

TECHNICAL FIELD

The present invention in general relates to a field of security and service authentication. In particular, the invention relates to optimization of Security Association (SA) in Media Independent Handover (MIH) services.

BACKGROUND ART

Mobile telecommunication systems are based on various communication standards, for example, Worldwide Interoperability for Microwave Access (WiMAX) standard, Wireless Local Area Network (WLAN) standards, Wireless Fidelity (WiFi) standard, 3rd Generation Partnership Project (3GPP), and the like. The mobile telecommunication systems provide various types of services such as voice, packet data exchange, and the like. In the mobile telecommunication systems, user data is exchanged between a Mobile Node (MN) and a base station by establishing a connection. For enabling a connection in the mobile telecommunication systems a radio access network (RAN) is required. The RAN is part of a telecommunication system.

Generally at a particular geographical location, there can be one or more RANs that enable MNs to use mobile telecommunication services. Each of the one or more RAN is associated with a Core Network (CN). Each of the one or more RANs is associated with a communication standard. Further, a MN can move from one RAN associated with one communication standard to another RAN associated with another communication standard using Media Independent Handover (MIH) services. However, authenticity of MN for using MIH services should be maintained. Thus security and service authentication procedures are performed prior to enabling communication.

According to IEEE 802.21 communication standard, MIH security is implemented using service access control procedures. The service access control can provide MIH security independent to network access and network protection. However, it also shares authentication server, for example AAA server and access authentication, with media and network access. The access authentication establishes keys for using MIH services and media and/or network protection. Some MIH services are accessed using Information Server (InfoServ). The InfoServ is a centralized entity. For example the InfoServ is associated with the CN. Thus, the InfoServ authentication should also be performed to access the MIH services.

In the mobile telecommunication system each of the one or more RAN includes a Point of Service for providing Event Services (ES), Information Services (IS) and Command Services (CS) to the MNs. The PoS should also have a trust relationship with the InfoServ in the CN for accessing the MIH services provided by the InfoServ. Further, all the mobile nodes (MNs) in each of the one or more RANs may also have to establish a Service Authorization (SA) with the InfoServ.

Thus InfoServ authentication uses a higher layer transport for the authentication, as the InfoServ authentication is present in CN and not in RAN. Therefore MN associated with a RAN needs to perform a network access authentication and MIH service SA establishment with PoS associated with the RAN. However, for accessing InfoServ a Security Association (SA) should also be established with PoS associated with the core network. In an embodiment, the InfoServ is a PoS.

Thus, IEEE 802.21 MIH security requires a MN associated with a RAN to use service access control or service authentication to establish SA with a PoS associated with the RAN. Further the MIH security also requires MN to have SA with the PoS associated with the CN. There are various methods for establishing SA. One method is to use key hierarchies. In the key hierarchy method, a root key is used to derive further keys based on identities of participating network entities. The first level of the derived key is established between the PoS associated with the RAN and the PoS associated with the CN. A second level of the derived key can be derived by the MN and the PoS associated with the CN. MN can use the second level of derived key to access the PoS associated with the CN. Thus significant processing is required for providing service authentication.

DISCLOSURE OF INVENTION

Technical Problem

Hence there exists a need for optimizing authentication procedures in MIH services.

Solution to Problem

An aspect of the present invention is to address at least the above-mentioned problems and/or disadvantages and to provide at least the advantages described below. Accordingly, an aspect of the present invention is to provide an apparatus and method for optimizing authentication procedures in media independent handover services.

In accordance with an aspect of the present invention, a method for establishing SA mechanism between a Mobile Node (MN) and a plurality of Point of Services (PoS) in a communication network is provided. The method includes sending a first request from primary PoS to secondary PoS. The first request is at least one of a first registration request and/or a first authentication request. The method then receives a first response at the primary PoS along with a derived key from the secondary PoS. The first response is at least one of a first registration response and/or a first authentication response. In an embodiment, the first key is derived at the secondary PoS based on a primary PoS identity. Further the method receives a second request at the primary PoS from the MN, for accessing the secondary PoS. The second request is at least one of a second registration request and/or a second authentication request. Furthermore, the method derives a second key based on a MN identity and the derived first key. Moreover, the method sends a second response along with a second key from the primary PoS to the MN. In an embodiment, the second response is at least one of a second registration response and/or a second authentication response from the primary PoS to the MN. Thereafter, the method establishes communication between the secondary PoS and the MN based on the second key received by the MN and the second key generated at the secondary PoS. The second key is generated at the secondary PoS based on the MN identity and the primary PoS identity.

In accordance another aspect of the present invention, a communication node is provided. The communication node includes a transceiver and a processor. The transceiver receives sending a first request from a primary PoS to a secondary PoS. The transceiver the receives a first response at the primary PoS along with a derived key from the secondary PoS. Further, the transceiver is also capable of receiving a second request from a Mobile Node (MN) for accessing the secondary PoS. The transceiver then sends a second response along with a second key from the primary PoS to the MN. The processor in the communication node is capable of deriving a second key based on the MN identity and the derived first key. Further, the processor also establishes communication between the secondary PoS and the MN based on the second key received by the MN and the second key generated at the secondary PoS.

Other aspects, advantages, and salient features of the invention will become apparent to those skilled in the art from the following detailed description, which, taken in conjunction with the annexed drawings, discloses exemplary embodiments of the invention.

Advantageous Effects of Invention

Exemplary embodiments of the present invention provide methods for establishing security association mechanism between a mobile node and a plurality of Point of Services (PoS) in a communication network. The method optimizes authentication procedures for using MIH services. The method reduces the processing that is required for providing service authentication. Thereby reducing time required for authentication and service access. The method further helps a PoS to balance processing and network load at the CN.

BRIEF DESCRIPTION OF DRAWINGS

The above and other aspects, features, and advantages of certain exemplary embodiments of the present invention will be more apparent from the following description taken in conjunction with the accompanying drawings, in which.

Persons skilled in the art will appreciate that elements in the figures are illustrated for simplicity and clarity and may have not been drawn to scale. For example, the dimensions of some of the elements in the figure may be exaggerated relative to other elements to help to improve understanding of various exemplary embodiments of the present disclosure.

Throughout the drawings, it should be noted that like reference numbers are used to depict the same or similar elements, features, and structures.

MODE FOR THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

FIGS. 1 through 7, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

Figure 1:
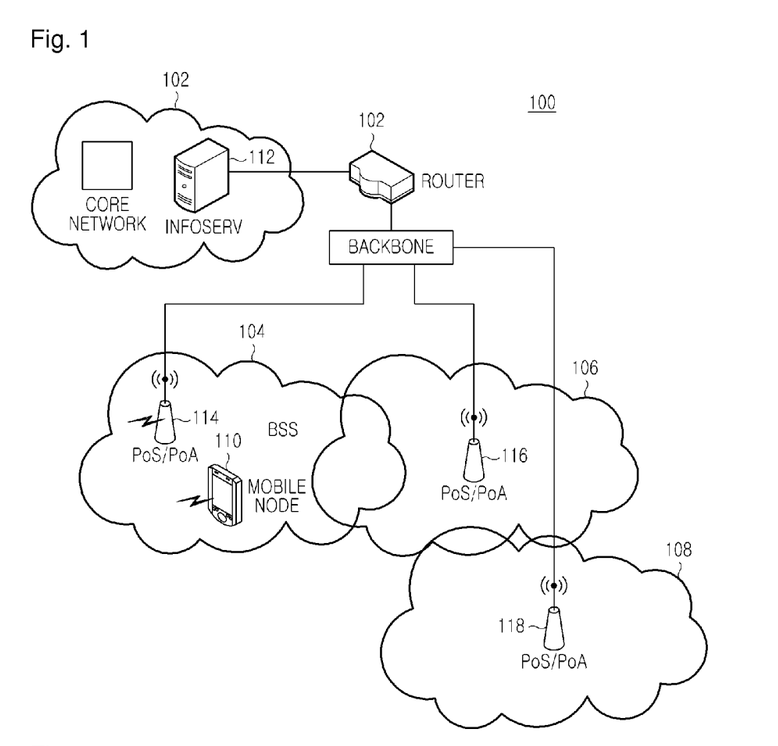
FIG. 1 and FIG. 2 illustrates a communication network, in accordance with an exemplary embodiment of the present invention.
Figure 2:
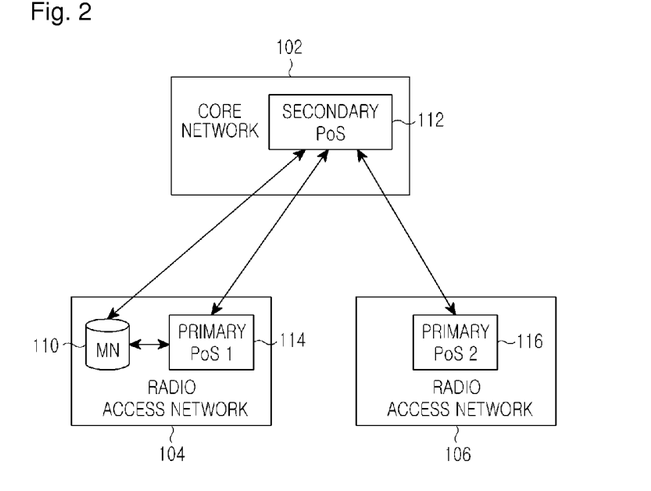

FIG. 1 and FIG. 2 illustrates a communication network, in accordance with an exemplary embodiment of the present invention.

Referring to FIG. 1, the communication network includes a Core Network (CN), a plurality of Radio Access Network (RAN) and a Mobile Node (MN). For the purpose of this description and explanation, only one CN, three RAN and one MN is shown in the figure, however it does not restrict the invention to the above mentioned entities and the person having ordinary skill in the art may explain the invention using more or less number of RAN and more number of CNs and MNs.

Each of the plurality of RAN and the CN is associated with a PoS. For example, the CN 102 is associated with PoS 112. In an embodiment, PoS 112 is an Information Server, for example InfoServ 112. Similarly, the RAN 104 is associated with PoS 114, the RAN 106 is associated with PoS 116 and the RAN 108 is associated with PoS 118. The PoS provide some or all of the Media Independent Handover (MIH) services as specified in IEEE 802.21. For example, PoS provide Event Services (ES), Information Service (IS) and Command Services (CS). Each RAN may have a plurality of MN interacting with the respective RAN PoS.

In an embodiment, the PoS associated with each of the plurality of RAN, for example the RAN 104, 106 and 108, registers with the InfoServ 112. Further, the MN in the RAN also registers, authorizes and authenticates with the corresponding PoS of the RAN. For example, the MN 110 in the RAN 104 registers itself with the PoS 114 for accessing Media Independent Handover (MIH) services. Similarly, the MN will also register itself with the InfoServ 112 associated with the CN 102.

Referring to FIG. 2, the communication network includes two RAN and a CN. The two RAN are the RAN 104 and the RAN 106, and the CN is the CN 102. In the FIG. 1B, the PoS 112 associated with the CN 102 is termed as secondary PoS. Further, the PoS associated with the RAN 104 is termed as primary PoS. The MN 110 is registered with the primary PoS 114. In an embodiment, the invention applies to an IEEE 802.21 deployment network using MIH based security for securing MIH traffic.

The primary PoS 114 may provide one or more IS, ES and CS in the RAN 104. In an embodiment, one or more IS, ES and CS are served by centralized PoS, which is referred as the secondary PoS 112 in the CN 102. The secondary PoS 112 is normally shared among one or more RANs in an operator's domain, as shown in the environment 100. The secondary PoS 112 will be deployed centrally in the CN 102, while the primary PoS are deployed in their corresponding RANs. The arrows in the FIG. 1B depict mutual SA and/or trust relationship between the entities.

The SA between the MN and the secondary PoS is achieved based on a novel key derivation and key distribution mechanism. The primary PoS 114 and the primary PoS 116 establishes a SA/Trust relationship with the secondary PoS 112. The secondary PoS then derive a key based on identity of the primary PoS 114 and a key based on identity of the primary PoS 116. The MN 110 then establishes a SA with the primary PoS 114. The primary PoS 114 then sends the key to the MN 110. Further the MN 110 establishes an SA with the secondary PoS directly based on the key received and derived using the above method. Thus, the secondary PoS for establishing SA will simultaneously generate itself the secondary key based on the primary PoS identity and MN identity.

In an embodiment, the SA/trust relationship establishment may be facilitated by a standard authentication mechanism. Moreover, the process of SA establishment will be initiated by a Registration/Authentication request message, sent by the entity requesting MIH services. As depicted in FIG. 1A and FIG. 1B, this message may be sent by the primary PoS 114 and the MN 110 respectively. After completion of an SA/authentication message exchange, and establishment of the SA, the servicing entity will reply back with a successful Registration/Authentication response message along with the derived key that may be used for SA.

Figure 3:
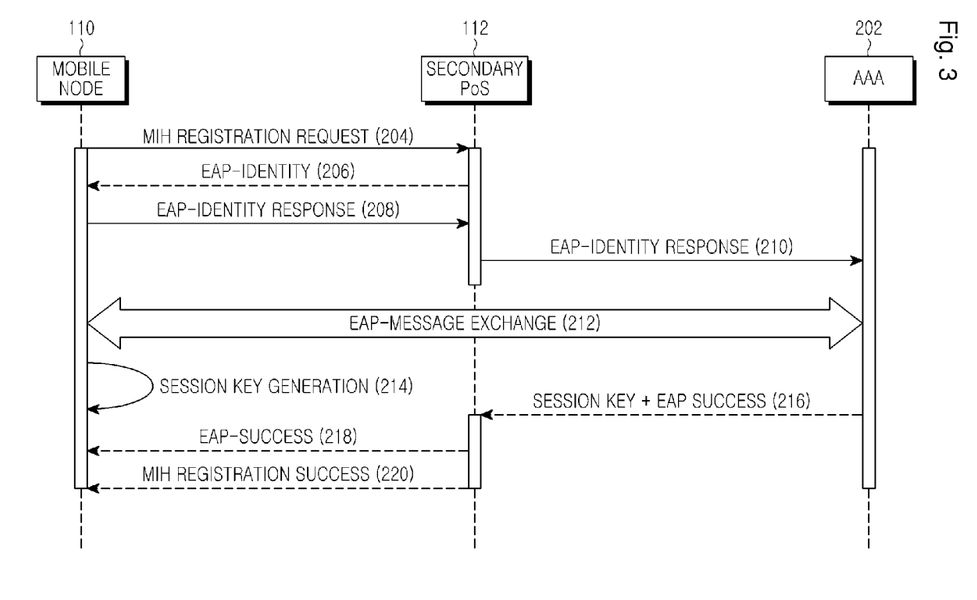
FIG. 3 illustrates a service access control authentication mechanism in accordance with prior art.

FIG. 3 illustrates a service access control authentication mechanism in accordance with prior art.

Referring to FIG. 3, a security mechanism is established, before the MN 110 sends a request to the secondary PoS 112. The MN 110 needs to establish a SA with the secondary PoS 112. In an embodiment, the SA has to be established by all the MN's that are incoming in the communication network and the MNs that are willing to avail MIH services. In an embodiment, the communication network shall maintain central secondary PoS for all MNs. The MNs after doing an access authentication will send a request for using MIH services (according to IEEE 802.21 communication standard). Hence, at step 204, an MN 110 will send a MIH registration request to the secondary PoS 112. In an embodiment, an authentication Extensible Authentication Protocol (EAP) authentication protocol is being used for authentication.

At step 206, an EAP identity response is sent by the secondary PoS 112 to the MN 110 based on the MIH registration request. At step 208, the EAP identity response is sent by the MN 110 to the secondary PoS 112. At step 210, the EAP identity response is sent to Authentication, Authorization, and Accounting (AAA) server 202. This method verifies the security credentials by the supported EAP method. In an embodiment, the method includes EAP-Transport Layer Security (EAP-TLS), EAP-Microsoft Challenge-handshake Authentication Protocol Version 2 (EAP-MSCHAPv2), and EAP-Pre-Shared Key (EAP-PSK), and the like.

At step 212, an EAP message exchange is done between the AAA server 202 and the MN 110. In an embodiment, the number of data packets in the EAP message exchange can be variable according to the selected EAP method. For example, corporate deployment of such access networks normally use X509 certificates, which are used by EAP methods such as EAP-TLS. The EAP-TLS method involves on an average exchange of 12 or more data packets [as mentioned in RFC 2716]. The data packets need to be transported from the MN 110 to the AAA server 202 in the CN 102.

At step 214, a session key is generated at the MN 110 based on the EAP message exchange. Similarly, a session key is established at the AAA server 202 and the session key along with the EAP success message is sent by the AAA server 202 to the secondary PoS 112, at step 216. At step 218, the EAP success message is sent by the secondary PoS 112 to the MN 110. Thereafter, at step 220, the MIH registration success message is sent by the secondary PoS 112 to the MN 110. Thus a bulk of the exchanges of data packets (traffic) is multi-hop, as the data packets are routed and switched multiple numbers of times for reaching the CN and for using the MIH services.

Figure 4:
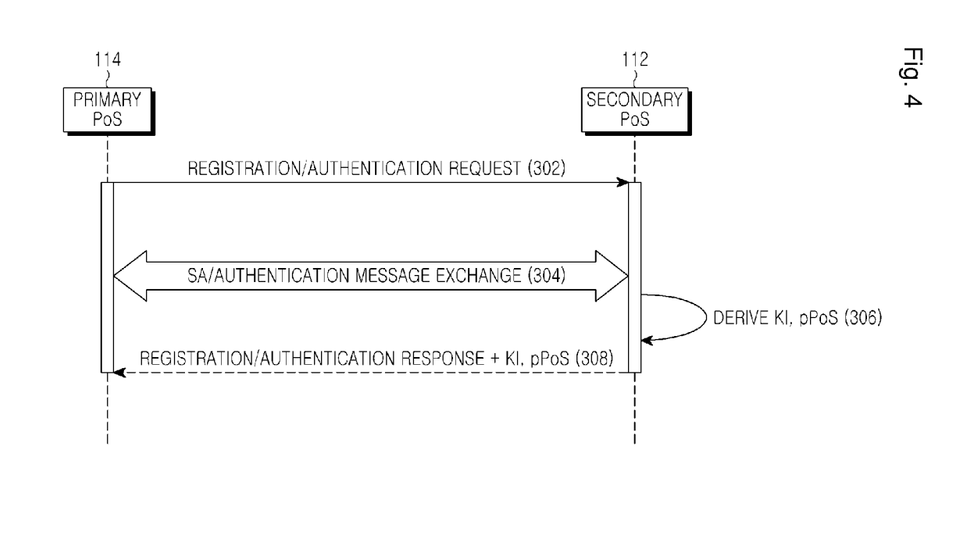
FIG. 4 illustrates a call flow diagram for establishing Security Association (SA) between a primary Point of Service (PoS) and a secondary Point of Service (PoS), in accordance with an embodiment.

FIG. 4 illustrates a flow diagram for establishing Security Association (SA) between a primary Point of Service (PoS) and secondary PoS, in accordance with an embodiment.

Referring to FIG. 4, the flow diagram will result in delivery of a derived key from the secondary PoS 112 to the primary PoS 114. At step 302, the primary PoS 114 sends a Registration/Authentication request message to the secondary PoS 112. At step 304, zero or more packets are exchanged between the primary PoS 114 and the secondary PoS 112 for establishing SA. At step 306, the secondary PoS 112 generates a key based on a primary PoS MIH/L2 identity i.e primary PoS-identity and as per the key hierarchy method. For example the secondary PoS derives the key '$K_{I_pPoS}$'.

At step 308, the key is delivered securely to the primary PoS 114 using one or more messages containing Registration/Authentication response and the key, '$K_{I_pPoS}$'. The message(s) is (are) secured using the SA credentials established between the primary PoS 114 and the secondary PoS 112. In an embodiment, the secondary PoS will store the generated key as per key lifetime policies.

In an embodiment, the procedure for deriving the key is given below. The method given below is for the sake of clarity and explanation and no where limits the scope of the invention to the below given method. Hence a person having ordinary skills in the art can use any other method to derive a key.

The key hierarchy proposed in the method uses a generic hierarchy based on an initial non null root key, for example '$K_I$'. The root key ($K_I$) can be a pseudorandom value or a derived key from another key hierarchy and will be generated at the secondary PoS 112. In an embodiment, the key for SA can be derived from $K_I$ without constraints, using an appropriate Key Derivation Function (KDF). The KDF shall output a non null key of a desired length as an output.

The L2/MIH identity of the primary PoS (pPoS) 114 will be one of the inputs to such a KDF, so that use of no two primary PoS identities can generate the same derived key. However, it is assumed that no two primary PoS shall have the same MIH/L2 identities.

The PoS specific key $K_{I, pPoS}$ can be represented as follows.

$K_{I,pPoS}$=KDF ($K_I$, pPoS-Identity, other parameters)

In an embodiment, the pPOS-Identity is an octet stream representing the distinct MIH or L2 identity of the pPoS. The KDF can take other parameters as input based on the requirement of the specific KDF. In an embodiment, the KDF must have the property that no two distinct PoS-identities can generate the same key. For example PoS having their identities as pPOS-Identity1 and pPOS-Identity2, implies the following condition.

$K_{I,pPoS1}$=$K_{I,pPoS2}$ if and only if pPOS-Identity1=pPOS-Identity2

Thus the above two derived keys shows that no two derived keys can be same if the input for pos-identity are different and thus different pos will derive different keys.

Figure 5:
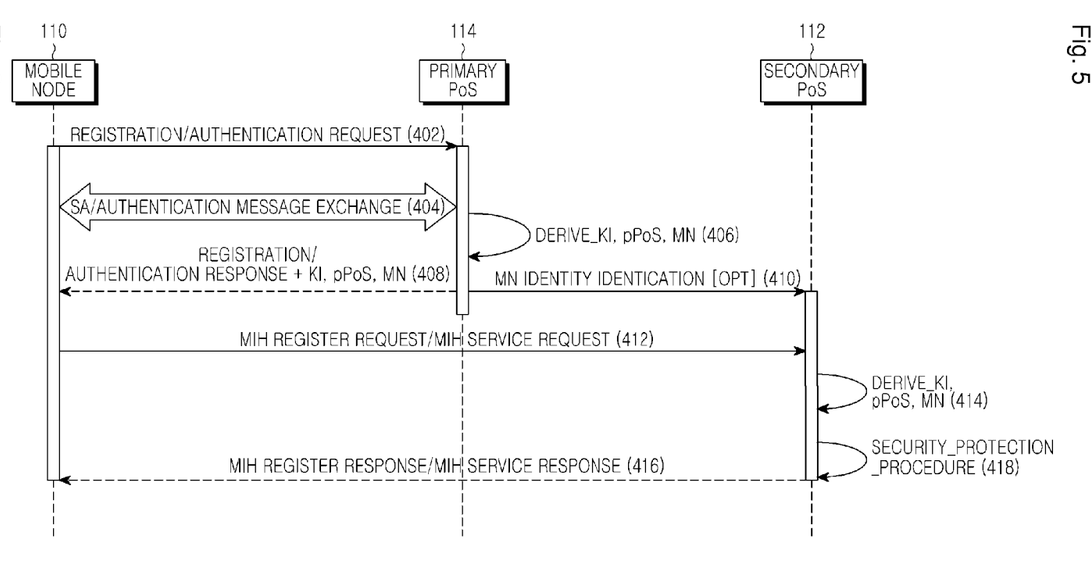
FIG. 5 illustrates a call flow diagram for establishing Security Association (SA) between a Mobile Node (MN) and the secondary PoS by derivation of a symmetric key, in accordance with an embodiment of the present invention.

FIG. 5 illustrates a call flow diagram for establishing the Security Association (SA) between a mobile node (MN) and the secondary PoS by derivation of a symmetric key, in accordance with an embodiment. The figure will be explained in conjunction with the description of FIG. 4.

Referring to FIG. 5, the call flow diagram will result in the delivery of a derived key from Primary PoS to the MN. In an embodiment, this method is performed after performing the method mentioned in FIG. 4. The MN 110 performs a L2 attachment and possible authentication with the RAN 104. At step 402, the MN 110 sends a Registration/Authentication request message to the primary PoS 114. At step 404, zero or more packets are exchanged between the primary PoS 114 and MN 110 establishing a security association. At step 406, the primary PoS 114 generates a key, for example the key '$K_{I,pPoS, MN}$' is derived from $K_{I, pPoS}$, based on the MN's 110 MIH identity, MN-Identity as per the agreed key hierarchy.

At step 408, the key is delivered securely to the MN 110 using one or more messages containing Registration/Authentication response and the key $K_{I,pPoS, MN}$. The message(s) is (are) secured using the SA credentials established between the MN 110 and the primary PoS 114. One or more such keys may be delivered based upon number of secondary PoS existing and a number of secondary PoS supporting this mechanism.

At step 410, the primary PoS 114 may optionally send an MN Identity indication message to the secondary PoS 112 along with the successful derivation and delivery of the key $K_{I,pPoS,MN}$. In an embodiment, one or more such messages can be sent based upon the number of secondary PoS existing and supporting the mechanism. In an embodiment, the MN 110 will store the generated key as per the key lifetime policies.

Therefore, whenever the MN 110 will establish SA with the secondary PoS 112, the key is not specifically derived between the MN 110 and the secondary PoS 112. This is because when the key $K_{I, PoS, MN}$ is delivered to the MN 110, the MN 110 can store it to protect the MIH communication with the secondary PoS or alternatively use it in additional steps for SA establishment. Thus such traffic may include MIH request messages. In an embodiment, the secondary PoS 112 can generate a key associated with the MN 110 based on various methods. In one method, the secondary PoS 112 can use the MN Identity indication message to know the MIH identity of the MN 110 [MN-Identity], and use it to generate an appropriate $K_{I, PoS, MN}$ from the stored key.

In another method, the secondary PoS 112 extracts the MN-Identity from either MIH Registration request or from the first MIH Service request message. In another method, indexing information of the $K_{I, pPoS}$ be made part of the message, enabling the secondary PoS 112 to identify an appropriate $K_{I, pPoS}$ to be used for key derivation. In yet another method, the secondary PoS 112 may optionally use transport identity of the MN 110 to find a network (and primary PoS) to which the MN is attached, and thus selects the required $K_{I,pPoS}$ for derivation.

A successful generation of the $K_{I, pPoS, MN}$ key at the secondary PoS can suffice Security Association (SA) establishment between the MN 110 and the secondary PoS 112. The secondary PoS 112 can then use the key to perform MIH protection mechanism on the MIH Request/Response messages exchanges with the MN. At step 412, the MN 110 sends a MIH Register request or MIH Service request to the secondary PoS 112. At step 414, the secondary PoS generates a key associated with the MN 110, based on any of the method described above.

In an embodiment, the key is generated based on the following method. The key derived below is just for the purpose of explanation and no where limits the scope of the invention to the below method. Hence a person having ordinary skills in the art can derive the key using any of the method.

In an embodiment, the primary PoS 114 derives keys based on a KDF, and using the $K_{I, pPoS}$ as the root key. Such a derived key will use as the distinct MN MIH identity as one of the parameter to the KDF. Hence a MN specific key $K_{I,pPoS, MN}$ can be written as $K_{I, pPoS, MN}$=KDF ($K_{I, pPoS}$, MN-Identity, Other parameters)

In an embodiment, the MN-Identity shall be an octet stream representing distinct MIH identity of the PoS. The KDF can take other parameters as input based on the requirement of the specific KDF. In an embodiment, no two distinct MN-Identity parameters shall yield the same $K_{I,pPoS, MN}$. The primary PoS 114 may generate multiple $K_{I,pPoS,MN}$ based on different $K_{I, pPoS}$ delivered by different secondary PoS.

At step 416, the secondary PoS 112 will send the MIH Register response/MIH Service response to the MN 110. In an embodiment, the secondary PoS 112 also performs security protection procedures, as shown in step 418.

Figure 6:
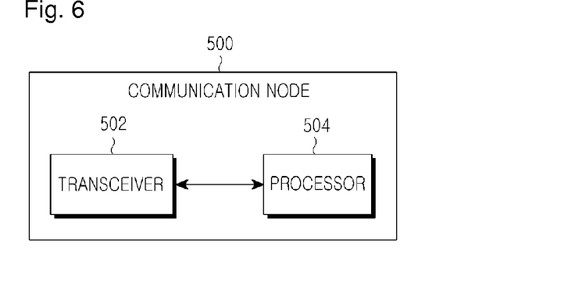
FIG. 6 illustrates a communication node, in accordance with an exemplary embodiment of the present invention.

FIG. 6 illustrates a communication node, in accordance with an exemplary embodiment of the present invention.

Referring to FIG. 6, the communication device 500 includes a transceiver 502 and a processor 504. In an exemplary embodiment, the transceiver 502 sends a first request from primary PoS 114 to secondary PoS 112. In an exemplary embodiment, the first request is a first registration request and/or a first authentication request. The transceiver 502 further receives a first response at the primary PoS 114 along with a derived key from the secondary PoS 112. In an exemplary embodiment, the first response is a first registration response and/or a first authentication response. In an exemplary embodiment, the first key is derived at the secondary PoS 112 based on a primary PoS identity.

The transceiver 502, then receives a second request from a MN 110, for accessing the secondary PoS 112 and/or primary PoS 114. The processor 504 then derives a second key based on the MN identity and the derived first key. The transceiver 502 then sends a second response along with a second key from the primary PoS to the MN. In an exemplary embodiment, the second response is at least one of a second registration response and/or a second authentication response from the primary PoS 114 to the MN 110. In an exemplary embodiment, the processor 504 then establishes communication between the secondary PoS 112 and the MN 110 based on the second key received by the MN 110 and the second key generated at the secondary PoS 112. In an embodiment, the second key is generated at the secondary PoS 112 based on the MN identity and the primary PoS identity.

Figure 7:
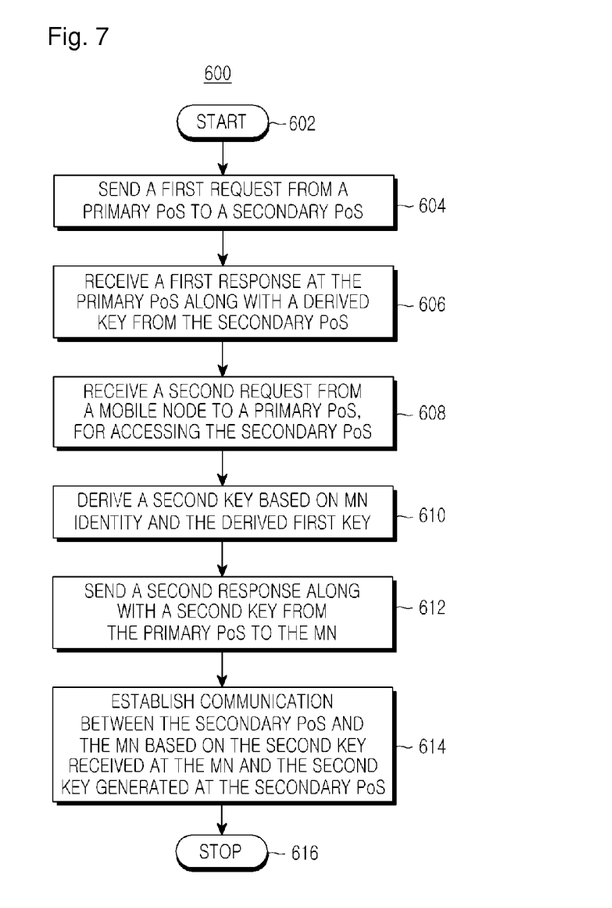
FIG. 7 illustrates a flowchart depicting a method for optimizing authentication procedures in media independent handover services.

FIG. 7 illustrates a flowchart depicting a method for optimizing authentication procedures in media independent handover services.

To assist in explanation of the method 600, reference will be made to figures described above (i.e., FIG. 1 to FIG. 6). However, it will be apparent to a person ordinarily skilled in the art that the present exemplary embodiment can be explained with the help of any other suitable embodiment of the present invention. The method 600 can also include more or fewer processes than those depicted in FIG. 7. Further, the order of the steps may also vary.

Referring to FIG. 7, the method 600 is initiated at step 602. At step 604, the method 600 sends a first request from primary PoS to secondary PoS. In an embodiment, the primary PoS is associated with the first RAN 104 and the secondary PoS is associated with the CN 102 in the communication network, as shown in FIG. 1 and FIG. 2. For example, the primary PoS is the primary PoS 114 and the secondary PoS is the secondary PoS 112. In an exemplary embodiment, the first request is at least one of a first registration request and/or a first authentication request. The request flow is shown at step 302 in FIG. 4.

At step 606, the method receives a first response at the primary PoS 114 along with a derived key from the secondary PoS 112. In an embodiment, the first response is at least one of a first registration response and/or a first authentication response. Further, the first key is derived at the secondary PoS 112 based on a primary PoS identity. The first response is depicted at step 308 in FIG. 4. In an embodiment, the method exchanges one or more services authentication messages between the primary PoS 114 and the secondary PoS 112 prior to receiving the first response at the primary PoS 114. The exchange of one or more services authentication messages between the primary PoS 114 and the secondary PoS 112 is shown at step 304 in FIG. 4.

At step 608, the method 600 receives a second request from a Mobile Node (MN) for accessing the secondary PoS 112. In an embodiment, the MN is associated with the first Radio Access Network (RAN) 104, for example the MN 110. In an exemplary embodiment, the second request is at least one of a second registration request and/or a second authentication request. For example, the second request is shown at step 402 in FIG. 5. At step 610, a second key is derived based on the MN identity and the derived first key. For example, the key is derived at the primary PoS 114 at step 406 in FIG. 5. In an embodiment, the first key is derived based on the agreed key hierarchy mechanism.

Thereafter at step 612, a second response is sent along with a second key from the primary PoS 114 to the MN 110. In an embodiment, the second response is at least one of a second registration response and/or a second authentication response from the primary PoS 114 to the MN 110. In an embodiment, the identity of the MN 110 is also sent to the secondary PoS 112 simultaneously by the primary PoS 114, when the second response along with the second key is sent by the primary PoS 114 to the MN 110. For example, the response from the primary PoS 114 to the MN 110 and the secondary PoS 112 is shown at step 408 and 410 respectively in the FIG. 5. In an embodiment, the method exchanges one or more services authentication messages between the MN 110 and the primary PoS 114 prior to sending a second response along with a second key from the primary PoS 114 to the MN 110.

At step 614, the method 600 establishes communication between the secondary PoS 112 and the MN 110 based on the second key received by the MN 110 and the second key generated at the secondary PoS 112. In an embodiment, the second key is generated at the secondary PoS 112 based on the MN identity and the primary PoS identity. In an embodiment, the method sends a request from the MN 110 to the secondary PoS 112 prior to establishing MIH services communication with the secondary PoS 112. In an embodiment, the method further sends MIH service response from the secondary PoS 112 to the MN 110. At step 616, the method 600 is terminated.

In an embodiment, the method establishes security protection mechanism between the MN and the secondary PoS using the second key.

In the preceding specification, the present disclosure and its advantages have been described with reference to exemplary embodiments. However, it will be apparent to a person of ordinary skill in the art that various modifications and changes can be made, without departing from the scope of the present disclosure, as set forth in the claims below. Accordingly, the specification and figures are to be regarded as illustrative examples of the present disclosure, rather than in restrictive sense. All such possible modifications are intended to be included within the scope of present disclosure.

Exemplary embodiments of the present disclosure are related to the use of a computer system for implementing the techniques described herein. In one exemplary embodiment, the techniques are performed by a processor by using information included in a memory. Such information can be read into the main memory from a machine-readable medium, such as a storage device. The information included in the memory causes the processor to perform the method described herein.

The term "machine-readable medium" as used herein refers to any medium that participates in providing data that causes a machine to operation in a specific fashion. In an exemplary embodiment which is implemented using the computer system, various machine-readable mediums are involved, for example, in providing information to the processor for execution. The machine-readable medium can be a storage media. Storage media includes both non-volatile media and volatile media. Non-volatile media includes, for example, optical or magnetic disks, such as a server storage unit. Volatile media includes dynamic memory. All such media must be tangible to enable the information carried by the media to be detected by a physical mechanism that reads the information into a machine.

Common forms of machine-readable medium include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge.

In an exemplary embodiment, the machine-readable medium can be a transmission media including coaxial cables, copper wire and fiber optics, including the wires that include a bus. Transmission media can also take the form of acoustic or light waves, such as those generated during radio-wave and infra-red data communications. Examples of machine-readable medium may include, but are not limited to, a carrier wave as or any other medium from which a computer can read, for example online software, download links, installation links, and online links.

While the invention has been shown and described with reference to certain exemplary embodiments thereof, it will be understood by those skilled in the art that various changes in form and details may be made therein without departing from the spirit and scope of the invention as defined by the appended claims and their equivalents.

The invention claimed is:

1. A method for establishing Security Association (SA) mechanism between a Mobile Node (MN) and a plurality of Point of Services (PoS) in a communication network, the method comprising:
   sending a first request including a primary PoS identity from a primary PoS to a secondary PoS, wherein the first request is at least one of a first registration request and a first authentication request;
   receiving a first response at the primary PoS along with a first key from the secondary PoS, wherein the first response is at least one of a first registration response and a first authentication response, wherein the first key is derived at the secondary PoS based on the primary PoS identity;
   receiving a second request including a MN identity from a Mobile Node at the primary PoS, for accessing the plurality of PoS, wherein the second request is at least one of a second registration request and a second authentication request;
   deriving, by the primary PoS, a second key based on the MN identity and the derived first key;
   sending a second response along with the second key from the primary PoS to the MN, wherein the second response is at least one of a second registration response and a second authentication response;
   sending the MN identity from the primary PoS to the secondary PoS; and
   establishing communication between the secondary PoS and the MN based on the second key received by the MN and the second key generated at the secondary PoS, wherein the second key is generated at the secondary PoS based on the MN identity and the primary PoS identity.

2. The method of claim 1 further comprising sending a request from the MN to the secondary PoS prior to establishing MIH service communication between the secondary PoS and the MN.

3. The method of claim 1, wherein the primary PoS is associated with a first Radio Access Network (RAN) in the communication network.

4. The method of claim 3, wherein the MN is associated with the first RAN in the communication network.

5. The method of claim 1, wherein the secondary PoS is associated with a Core Network (CN) in the communication network.

6. The method of claim 1 further comprising sending a Media Independent Handover (MIH) service response from the secondary PoS to the MN.

7. The method of claim 1 further comprising exchanging one or more services authentication messages between the primary PoS and the secondary PoS prior to receiving the first response at the primary PoS.

8. The method of claim 1 further comprising exchanging one or more services authentication messages between the MN and the primary PoS prior to sending the second response along with the second key from the primary PoS to the MN.

9. The method of claim 1 further comprising establishing a security protection mechanism between the MN and the secondary PoS using the second key.

10. The method of claim 1, wherein the first key is derived based on a key hierarchy method using a Key Derivation Function (KDF).

11. A communication node, the communication node comprising:
   a transceiver configured to:
      send a first request including a primary PoS identity from a primary Point of Services (PoS) to a secondary PoS;
      receive a first response at the primary PoS along with a first key from the secondary PoS, wherein the first key is derived at the secondary PoS based on the primary PoS identity;
      receive a second request including a MN identity from a Mobile Node (MN) at the primary PoS, for accessing the secondary PoS;
      send a second response along with a second key from the primary PoS to the MN;
      send the MN identity from the primary PoS to the secondary PoS; and
   a processor configured to:
      derive the second key based on the MN identity and the derived first key; and
      enable communication between the secondary PoS and the MN based on the second key received by the MN and the second key generated at the secondary PoS.

12. The communication node of claim 11, wherein the transceiver is further configured to send a request from the MN to the secondary PoS prior to the processor enabling communication between the secondary PoS and the MN.

13. The communication node of claim 11, wherein the primary PoS is associated with a first Radio Access Network (RAN) in a communication network.

14. The communication node of claim 13, wherein the MN is associated with the first RAN in the communication network.

15. The communication node of claim 11, wherein the secondary PoS is associated with a Core Network (CN) in a communication network.

16. The communication node of claim 11, wherein the transceiver is further configured to send and receive one or more services authentication messages to and from the secondary PoS prior to receiving the first response at the primary PoS.

17. The communication node of claim 11, wherein the transceiver is further configured to send and receive one or more services authentication messages to and from the MN prior to sending the second response along with the second key from the primary PoS to the MN.

18. The communication node of claim 11, wherein the first key is derived based on a key hierarchy method using a Key Derivation Function (KDF).

19. The communication node of claim 11, wherein the secondary PoS sends a Media Independent Handover (MIH) service response to the MN.

20. The communication node of claim 11, wherein the MN and the secondary PoS establish a security protection mechanism using the second key.

* * * * *